US012209737B2

(12) United States Patent
Harp et al.

(10) Patent No.: US 12,209,737 B2
(45) Date of Patent: Jan. 28, 2025

(54) REMOTE CONTROLLED LIGHT ADJUSTMENT DEVICE AND ASSOCIATED METHOD

(71) Applicant: Siemens Mobility, Inc., New York, NY (US)

(72) Inventors: Brian Harp, New Albany, NY (US); Bret Walker, Huntington, IN (US)

(73) Assignee: Siemens Mobility, Inc., New York, NY (US)

( * ) Notice: Subject to any disclaimer, the term of this patent is extended or adjusted under 35 U.S.C. 154(b) by 310 days.

(21) Appl. No.: 17/804,157

(22) Filed: May 26, 2022

(65) Prior Publication Data

US 2024/0003522 A1 Jan. 4, 2024

(51) Int. Cl.

| | |
|---|---|
| ***B61L 29/24*** | (2006.01) |
| ***B61L 29/28*** | (2006.01) |
| ***F21V 21/15*** | (2006.01) |
| *F21W 131/103* | (2006.01) |

(52) U.S. Cl.

CPC .............. *F21V 21/15* (2013.01); *B61L 29/24* (2013.01); *B61L 29/28* (2013.01); *F21W 2131/103* (2013.01)

(58) Field of Classification Search

CPC ........ B61L 29/24; B61L 29/246; B61L 29/28; F21V 21/15; F21V 21/22; F21V 21/24; F21V 21/26; F21V 21/28; F21V 21/29

See application file for complete search history.

(56) References Cited

U.S. PATENT DOCUMENTS 4,712,167 A * 12/1987 Gordin .................... F21V 21/15 362/85
4,811,181 A * 3/1989 Jones ...................... F21V 21/30 362/249.11

* cited by examiner

*Primary Examiner* — Sean P Gramling

(57) ABSTRACT

A remote controlled light adjustment device includes a horizontal adjustment arm, a vertical adjustment arm, a mounting base comprising multiple anchor points for coupling the horizontal adjustment arm and the vertical adjustment arm to the mounting base, and a remote control, wherein the mounting base, the horizontal adjustment arm and the vertical adjustment arm are configured to be mounted to a light device, and wherein the horizontal adjustment arm and the vertical adjustment arm are configured to move the light device based upon signals transmitted by the remote control and received by the mounting base.

11 Claims, 5 Drawing Sheets

REMOTE CONTROLLED LIGHT ADJUSTMENT DEVICE AND ASSOCIATED METHOD

BACKGROUND

1. Field

Aspects of the present disclosure generally relate to a device and a method for adjusting and aligning lights including a remote controlled light adjustment device. Specifically, the device and method are for use in a railway setting, for adjustment and alignment of railway signals that are positioned at grade crossings, such as crossing warning lights at highway grade crossings, and provide signals to intended observers, such as motorists of approaching vehicle traffic. It will be appreciated that the device and method of the present disclosure are applicable to many forms of post mounted lighting, signaling or other utility.

2. Description of the Related Art

The railroad industry, including but not limited to the freight railroad industry, employs signals, such as grade crossing warning devices that warn of the approach of a train at a grade crossing, examples of which include crossing gate arms, crossing lights, such as the red flashing lights often found at highway grade crossings in conjunction with the crossing gate arms, and/or crossing bells or other audio alarm devices.

Per the Federal Railroad Administration (FRA), proper alignment of crossing lights, herein also referred to crossing lamps, is essential and inspections for proper alignment in accordance with installation specifications are required. The Manual on Uniform Traffic Control Devices (MUTCD), issued by the Federal Highway Administration of the US Department of Transportation, specifies standards by which traffic signs, road surface markings, and signals are designed, installed, and used. In chapter 2C of the MUTCD, distance requirements for advance railroad crossing warning signs are specified, see table 2C-4 of the MUTCD. Further, according to for example Union Pacific Railroad (RR) Standards, to a large degree, a proper alignment point for front flashing light units and cantilever front and back light units is dependent upon the speed of approaching vehicle traffic. In general, the front lights and cantilever front and back lights should be aligned to a distance equal to the distance from the crossing that a railroad advance warning sign is located. If there is no railroad advance warning sign or it is not located at the distance specified in the table below, the distance shown in the table below is to be used.

| Posted Highway Speed (MPH) | Suggested Alignment Distance (Feet) |
|---|---|
| 20 | * |
| 25 | * |
| 30 | 100 |
| 35 | 150 |
| 40 | 225 |
| 45 | 300 |
| 50 | 375 |
| 55 | 450 |
| 60 | 550 |
| 65 | 650 |

*No suggested minimum distance provided.

The table should be used as a guide. Local conditions such as curves, road dips and rises, permanent obstructions, side road traffic and other traffic control devices may change the alignment point. Mast mounted back flashing light units should be vertically aligned so that the axis of the beam is approximately 50 feet from the nearest rail to the approaching traffic.

Hence, periodic alignment checks are required by the FRA. Crossing lamp alignment checks are performed for example by maintenance personnel going to specific focal points of the lamps and confirming proper alignment. Each lamp has a specific focal point at various location(s), and it involves activating the crossing lamp and walking to the location as traffic permits.

Up to the current time, there has not been a method for a single person to adjust a crossing flashing lamp other than the person climbing the flasher mast, making a guess at an adjustment, climbing back down, and walking out hundreds of feet on the road to check the result and repeating the process until the correct aim is obtained. An alternative is the use of a second person which many times is just not available. Thus, an improved technique for alignment and adjustment of crossing lights is desirable.

SUMMARY

A first aspect of the present disclosure provides a remote controlled light adjustment device comprising a horizontal adjustment arm, a vertical adjustment arm, a mounting base comprising multiple anchor points for coupling the horizontal adjustment arm and the vertical adjustment arm to the mounting base, and a remote control, wherein the mounting base, the horizontal adjustment arm and the vertical adjustment arm are configured to be mounted to a light device, and wherein the horizontal adjustment arm and the vertical adjustment arm are configured to move the light device based upon signals transmitted by the remote control and received by the mounting base.

A second aspect of the present disclosure provides a method for adjusting a light device, the method comprising installing a remote controlled light adjustment device at a light device, adjusting or aligning the light device using a remote control in combination with the adjustment device, and removing the remote controlled light adjustment device from the light device.

DETAILED DESCRIPTION

To facilitate an understanding of embodiments, principles, and features of the present disclosure, they are explained hereinafter with reference to implementation in illustrative embodiments. In particular, they are described in the context of a device and a method for adjusting or aligning a crossing warning light. Embodiments of the present disclosure, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
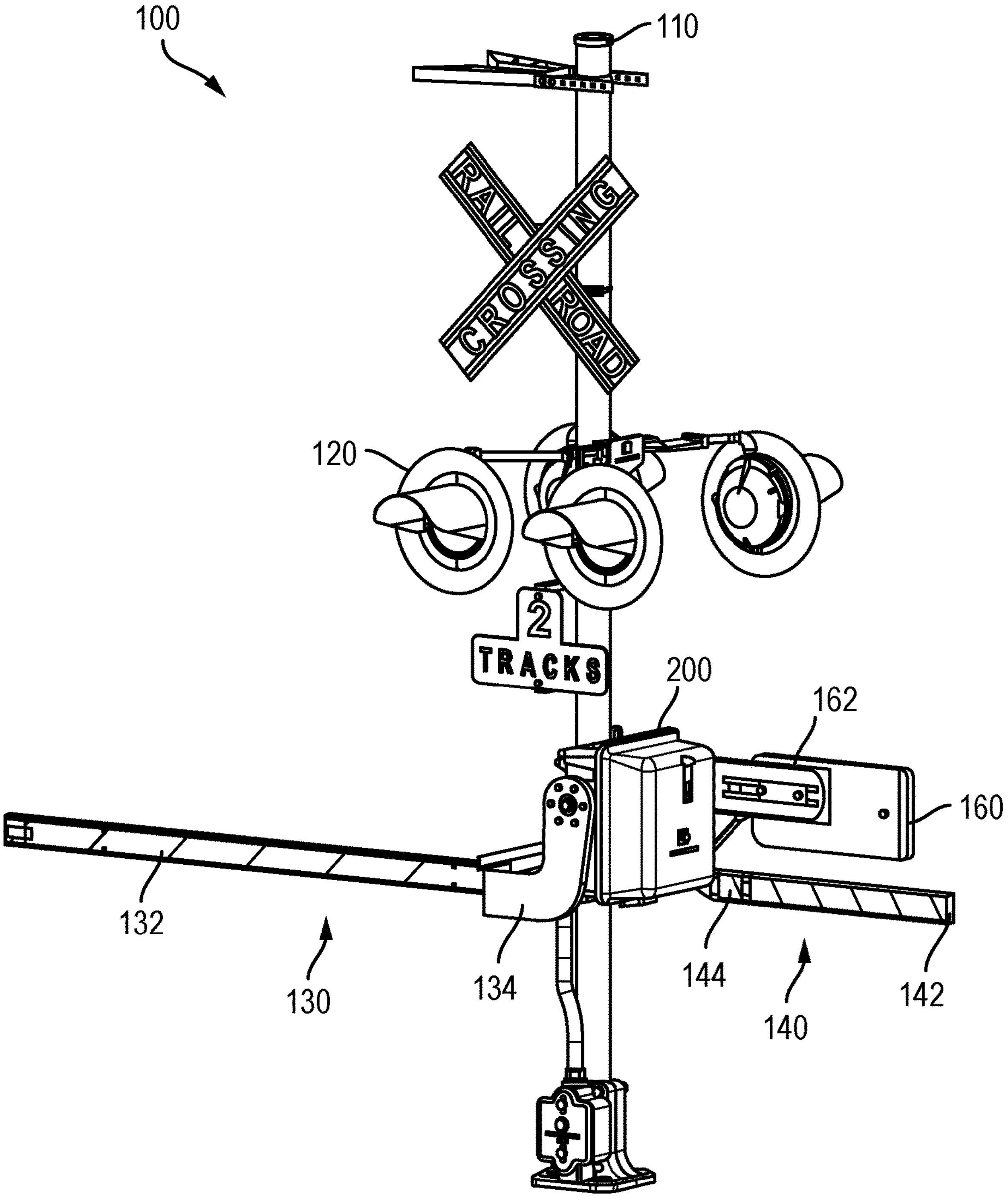
FIG. 1 illustrates an example railroad crossing gate in accordance with an exemplary embodiment of the present disclosure.

FIG. 1 illustrates an example railroad crossing gate in accordance with an exemplary embodiment of the present disclosure. Specifically, FIG. 1 illustrates a railroad crossing gate 100 in a lowered or horizontal position. At many railroad crossings, at least one railroad crossing gate 100 may be placed on either side of the railroad track to restrict roadway traffic in both directions. At some crossings, pedestrian paths or sidewalks may run parallel to the roadway. To restrict road and sidewalk traffic, the illustrated railroad crossing gate 100 includes a separate roadway gate 130 and pedestrian gate 140. The roadway gate 130 and pedestrian gate 140 may be raised and lowered, i.e. operated, by control mechanism 200.

The example railroad crossing gate 100 also includes a mast or pole 110 and signal lights 120. The gate control mechanism 200 is attached to the pole 110 and is used to raise and lower the roadway and pedestrian gates 130, 140. The illustrated railroad crossing gate 100 is often referred to as a combined crossing gate. When a train approaches the crossing, the railroad crossing gate 100 may provide a visual warning using the signal lights 120. The gate control mechanism 200 will lower the roadway gate 130 and the pedestrian gate 140 to respectively restrict traffic and pedestrians from crossing the track until the train has passed.

As shown in FIG. 1, the roadway gate 130 comprises a roadway gate support arm 134 that attaches a roadway gate arm 132 to the gate control mechanism 200. Similarly, the pedestrian gate 140 comprises a pedestrian gate support arm 144 connecting a pedestrian gate arm 142 to the gate control mechanism 200. When raised, the gates 130 and 140 are positioned so that they do not interfere with either roadway or pedestrian traffic. This position is often referred to as the vertical position. A counterweight 160 is connected to a counterweight support arm 162 connected to the gate control mechanism 200 to counterbalance the roadway gate arm 132. Although not shown, a long counterweight support arm could be provided in place of the short counterweight support arm 134.

Typically, the gates 130, 140 are lowered from the vertical position using an electric motor contained within the gate control mechanism 200. The electric motor drives gearing connected to shafts (not shown) connected to the roadway gate support arm 134 and pedestrian gate support arm 144. The support arms 134, 144 are usually driven part of the way down by the motor (e.g., somewhere between 70 and 45 degrees) and then gravity and momentum are allowed to bring the arms 132, 142 and the support arms 134, 144 to the horizontal position. In another example, the support arms 134, 144 are driven all the way down to the horizontal position by the electric motor of the gate control mechanism 200.

Figure 2:
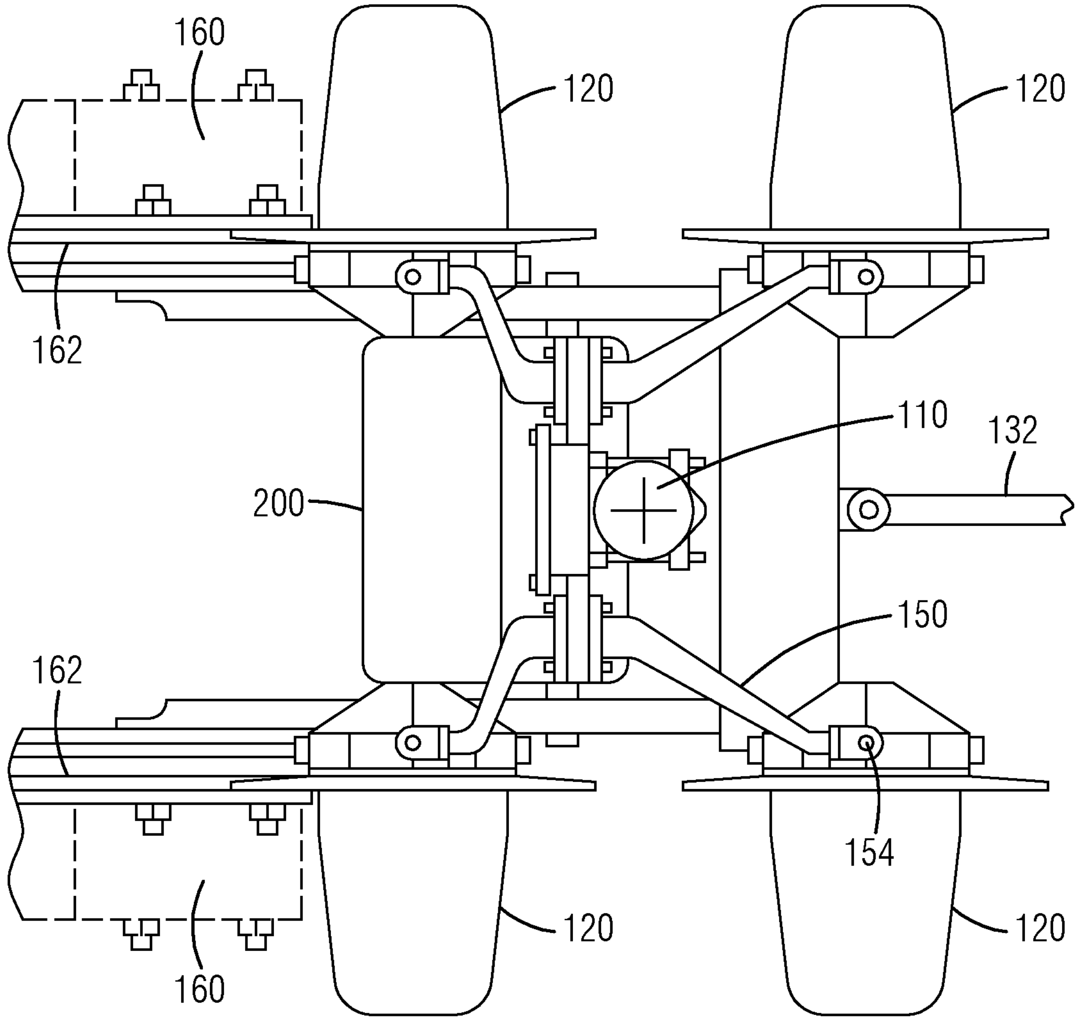
FIG. 2 illustrates a top view of a grade crossing warning light mast with gate mechanism in accordance with an exemplary embodiment of the present disclosure.

FIG. 2 illustrates a top view of a grade crossing warning light mast with gate mechanism in accordance with an exemplary embodiment of the present disclosure. The grade crossing warning light mast can be installed at a railroad crossing gate as illustrated for example in FIG. 1.

The mast 110 comprises or carries multiple signal lights, such as crossing warning lights 120. The crossing warning lights 120 are also known as grade crossing warning flashing lights or flashers. Gate control mechanism 200 is attached to the mast 110 and is used to raise and lower crossing gates, specifically road gate arm 132. The gate arm 132 is not shown completely but is only indicated by a short portion of the arm. When a train approaches the crossing, the crossing warning lights 120 provide a visual warning. The gate control mechanism 200 will lower the road gate arm 132 to restrict traffic from crossing a train track until the train has passed. Counterweights 160 are coupled to counterweight support arms 162 that are connected to the gate control mechanism 200 to counterbalance the roadway gate arm 132.

Each crossing warning light 120 is supported and mounted to the mast 110 by an assembly 150, wherein each assembly 150 comprises multiple mechanical components, such as brackets, bolts, elbow etc. Adjustment point 154 labels the location/spot where a position or orientation of the crossing warning light 120 is adjusted if necessary. Adjustment point 154 is shown in greater detail in FIG. 3 and essentially corresponds to elbow 124.

Figure 3:
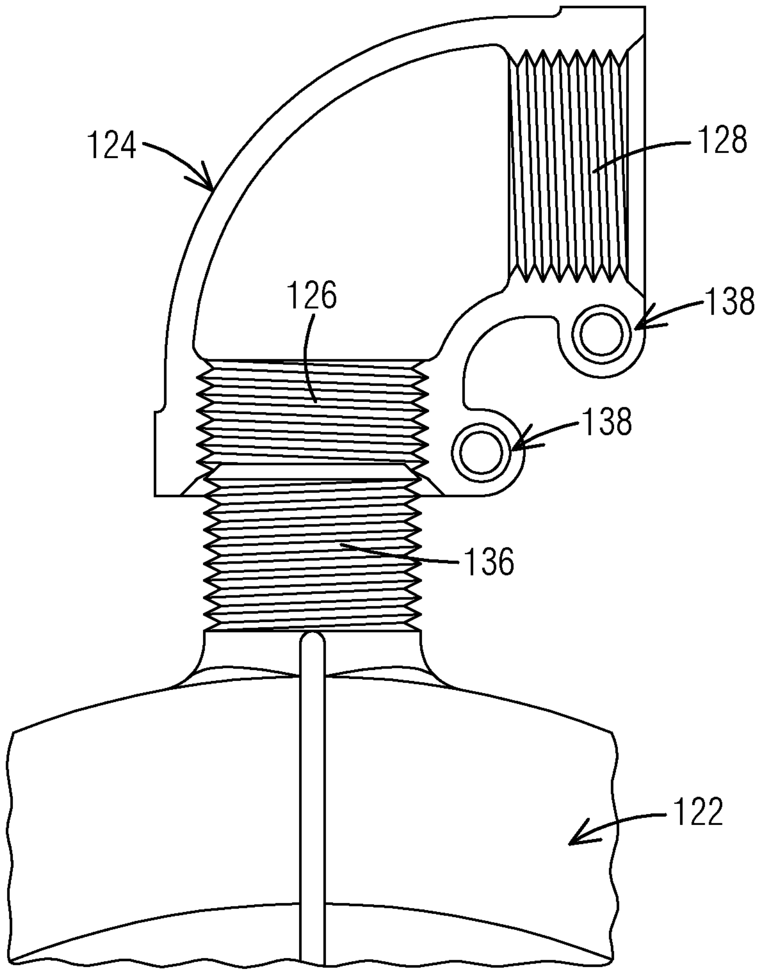
FIG. 3 illustrates a side view of a section of a grade crossing warning light in accordance with an exemplary embodiment of the present disclosure.

FIG. 3 illustrates a side view of a section of a grade crossing warning light in accordance with an exemplary embodiment of the present disclosure.

Specifically, FIG. 3 illustrates a section of a light head 122 of crossing warning light 120. Light head 122 may also be referred to as flasher head or flashing light head. The light head 122 is the component that comprises the light emitting elements, such as light emitting diodes (LEDs) or incandescent light bulbs.

The light head 122 is coupled via elbow 124 and further element(s), such as a bracket, to the mast 110 (see FIG. 1 or FIG. 2). The bracket (not shown) is connected to the elbow 124, and the bracket connects the elbow 124 to the mast 110. The elbow 124 is shown as cutaway view for clarity and comprises tapped or threaded holes 126 and 128. Light head 122 is screwed into the tapped hole 126 of the elbow 124, via corresponding thread 136. The bracket (not shown) is screwed into tapped hole 128.

The elbow 124 with its tapped holes 126 and 128 is used to adjust the crossing warning light 120, specifically a position and/or orientation of the light head 122, in a horizontal direction and a vertical direction. An adjustment of the light head 122 in the horizontal direction (left-right movement) can be achieved by moving/turning the light head 122 within tapped hole 126, and an adjustment in the vertical direction (up-down movement) can be achieved by moving the elbow 124, via threaded connection/tapped hole 128. The elbow 124 further comprises tension bolt locations 138, wherein tension bolts are used to fix the light head 122 and the elbow 124 once they are in a desired position.

Figure 4:
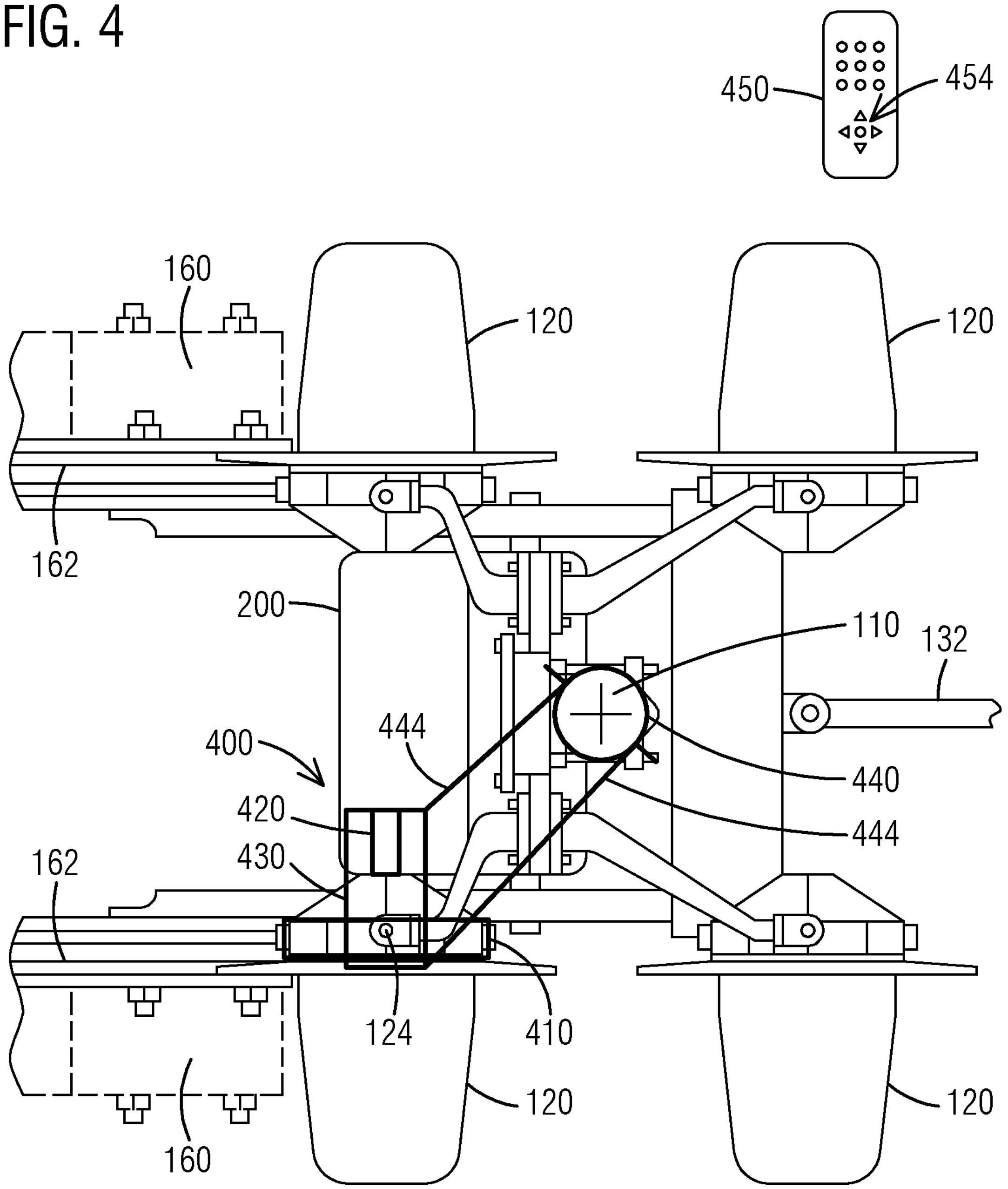
FIG. 4 illustrates a schematic of a remote controlled light adjustment device in a top view in accordance with an exemplary embodiment of the present disclosure.

FIG. 4 illustrates a schematic of a remote controlled light adjustment device together with a grade crossing warning light mast and crossing warning lights in a top view in accordance with an exemplary embodiment of the present disclosure. The top view of FIG. 4 corresponds to the top view of FIG. 2.

A remote controlled light adjustment device 400 can be used in a railroad crossing warning system, for example in connection with crossing warning lights 120. However, it should be noted that the described adjustment device 400 can be used not only for railroad crossing warning devices, but for many other light or lamp applications, for example road traffic lights or warning lights, within industrial facilities, airport facilities or within building technology applications.

As described before, the FRA requires proper alignment of lamps or lights, such as crossing lights 120. The lights 120 must be precisely aligned to direct a narrow intense beam toward approaching motorist(s). Each light has a specific focal point at various location(s). For example, a flashing light unit on the right-hand side of a highway or road is usually aligned to cover a distance far from the grade crossing (see table as described earlier).

In accordance with an exemplary embodiment, the remote controlled light adjustment device 400, herein also referred to shortly as adjustment device 400, comprises a horizontal adjustment arm 410, a vertical adjustment arm 420, and a mounting base 430, wherein the mounting base 430 has multiple anchor points for coupling the horizontal adjustment arm 410 and the vertical adjustment arm 420 to the mounting base 430. The horizontal adjustment 410 and the vertical adjustment arm 420 may be coupled permanently to the mounting base 430 or the arms 410 and 420 may be detachable from the mounting base 430.

The mounting base 430, the horizontal adjustment arm 410 and the vertical adjustment 420 arm are configured to be mounted to a light device, such as the crossing warning light 120. A 'light device' as used herein comprises generally a light or a lamp including LEDs and/or incandescent light bulbs, such as a crossing warning light, traffic light, building light, or many other types of lights used in an industrial setting.

Further, the remote controlled light adjustment device 400 comprises a remote control 450 which is configured to wirelessly communicate or transmit signals to the adjustment device 400, specifically the mounting base 430. The adjustment device 400, specifically the horizontal adjustment arm 410 and the vertical adjustment arm 420 are configured to move the light device 120 based upon signals transmitted by the remote control 450 and received by the mounting base 430.

For movement in the horizontal direction (left-right rotation/movement of the light 120), the horizontal adjustment arm 410 comprises an actuator so that a position of the light device 120 in a horizontal direction can be changed or modified. An end of the actuator is connected to the mounting base 430. Further, the horizontal adjustment arm 410 comprises brackets for holding a section of the light head 122 that allows rotation of the light head 122 by extending or retracting the actuator.

For movement in the vertical direction (up-down movement of the light 120), the vertical adjustment arm 420 comprises an actuator for a vertical movement of the light head 122 of the light device 120. A first end of the vertical adjustment arm 420 is connected to the mounting base 430, and a second end of the vertical adjustment arm 420 comprises a clip for coupling to a bottom section of the light device 120, for example the light head 122, such that the light device 120 is moveable in a vertical direction as the sliding actuator is extended or retracted.

The actuators of the horizontal and vertical adjustments arms 410, 420 are electrically powered linear actuators, controlled by the wireless remote control 450 that allows maintenance personnel to stand at a desired aiming point of the light device 120 on the road and control the left-right rotation as well as the up-down orientation of the light device 120 allowing the 'hot spot' or brightest part of a light beam to be placed at the required alignment point on the roadway.

The remote control 450 comprises controls 454 for left-right (horizontal) and up-down (vertical) to control the arms 410, 420, specifically at least one actuator in each arm 410, 420. The position/orientation of the light device 120, e.g. light head 122, is held when no button is pressed on the remote control 450. This feature allows to hold the position of the light device 120 when aiming is completed and the maintenance/field personnel will go back to the light device 120 and lock bolts to hold the position that the light 120 was aimed at.

The mounting base 430 further comprises a power source for powering the linear actuators of the horizontal and vertical adjustment arms 410, 420. The power source comprises for example one or more rechargeable batteries.

Further, the remote control 450 comprises a transmitter and the mounting base 430 comprises a receiver, the transmitter and receiver being configured to wirelessly transmit or receive signals. In an example, the transmitter and the receiver are configured to transmit and receive radio frequency (RF) signals. In other examples, the remote control 450 and the mounting base 430 may communicate wirelessly via Internet (Wi-Fi) or other appropriate wireless communication methods. Thus, the mounting base 430 and the remote control 450 comprise appropriate wireless communication interfaces. The receiver of the mounting base 430 is configured to activate the actuators of the horizontal adjustment arm 410 and vertical adjustment arm 420. The power source of the mounting base 430 is also configured to power the receiver and associated circuitry to active/control the actuators.

The adjustment device 400 further comprises an anchor 440, such as a clamp ring, configured to clamp around the mast 110 carrying the light device 120, and support bars 444, such as braces, connecting the mounting base 430 to the anchor 440 and to lock the mounting base 430 in place and allow for adjustments.

The components of the adjustment device 400 that are mounted to the light device 120, such as adjustment arms 410, 420 and mounting base 430, can be separate components or can be integrated or combined in one device. Further, the support bars 444 with anchor 440 may be integrated into the one device or may be separate and coupled to the mounting base 430 when in use.

Figure 5:
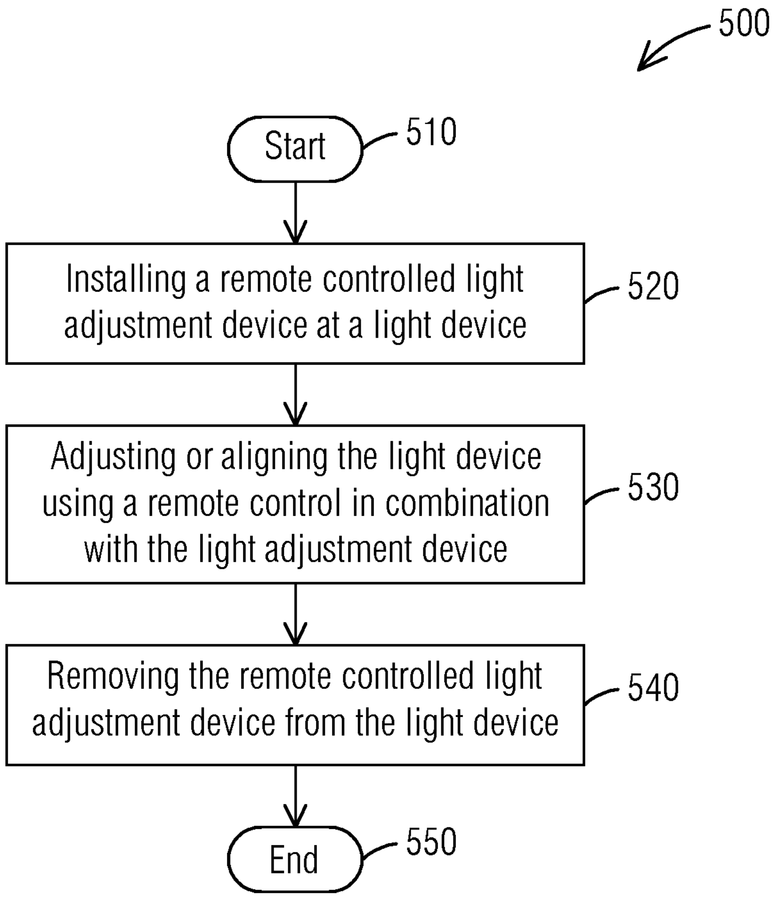
FIG. 5 illustrates a flow chart of a method for adjusting or aligning a signal in accordance with an exemplary embodiment of the present disclosure.

FIG. 5 depicts a flow chart of a method 500 for adjusting or aligning a light device, such as for example a crossing light, in accordance with an exemplary embodiment of the present disclosure. The process or method 500 can be implemented by using any of the features, components, or devices discussed herein, or any combination of them. In an embodiment, the method 500 is performed using a remote controlled adjustment device 400 as described herein with reference to FIG. 4.

While the method 500 is described as a series of acts that are performed in a sequence, it is to be understood that the method 500 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

Essentially, the method 500 may start at 510 and may include an act 520 of installing a remote controlled light adjustment device 400 at a light device, such as crossing warning light 120, see for example FIG. 1 or FIG. 4. The remote controlled light adjustment device 400 has been previously described with respect to FIG. 4. Act 530 includes adjusting or aligning the light device 120 using a remote control 450 in combination with the adjustment device 400, and act 540 includes removing the remote controlled light adjustment device 400 from the light device 120. At 550, the method 500 may end. Acts 520, 530, 540 can be repeated as often as needed to adjust multiple light devices.

More specifically, and with reference to FIG. 3 and FIG. 4, the steps 520, 530 and 540 of installing, adjusting, and removing comprise:

placing the mounting base 530 over elbow 124 of a light device 120, attaching the anchor 440, e.g. clamp ring, and support bars 444, e.g. braces, around the mast 110 where the light device 120 is located, aligning the horizontal adjustment arm 410 such that one or more brackets or fingers line up with a current position of the light head 122, wherein the alignment of the horizontal arm 410 can be performed using left-right buttons of the remote control 450, securing the anchor 440, e.g. clamp ring, around the mast 110, aligning the vertical adjustment arm 420 such that a clip or fingers clip into a hinge at a bottom section of the light head 122, wherein the alignment of the vertical arm 420 can be performed using up-down buttons of the remote control 450, loosening or removing bolts of the elbow 124 (see 138 in FIG. 2) at the light device such that light head 122 is movable in vertical and horizontal directions, proceeding to an aiming point of the light device 120 according to railroad standard procedure, adjusting, using the remote control 450, the light head 122 to provide a brightest light beam at the aiming point, the remote control 450 transmitting signals to the mounting base 430, returning to the light device 120 and tighten or applying the bolts at the elbow 124 to lock an adjusted position of the light head 122, removing the vertical adjustment arm 420 from the bottom section of the light head, loosening the anchor 440, e.g. clamp ring, and support bars 444, e.g. braces, from the mast 110, lifting or removing the mounting base 430 with horizontal and vertical adjustment arms 410, 420 from the elbow 124 of the light device, and repeating the above described steps to adjust other lights carried by masts.

It should be appreciated that the described method 500 may include additional acts and/or alternative acts corresponding to features described with respect to the adjustment device 400.

With the described device 400 and method 500, a single person is able to adjust or align light devices, such as highway crossing warning flashing lights, because the light adjustment device 400 and method 500 include a remote control device 450 that allows the light device to be adjusted from a far distance by the single person. Thus, only one trip out to an aiming point of the light device 120 and two trips up and down the mast 110 are necessary by maintenance or service personnel.

The invention claimed is:

1. A portable remote controlled light adjustment device comprising:

a horizontal adjustment arm, a vertical adjustment arm, a mounting base comprising multiple anchor points for coupling the horizontal adjustment arm and the vertical adjustment arm to the mounting base, and a remote control, wherein the mounting base, the horizontal adjustment arm and the vertical adjustment arm are configured to be temporarily mounted to a light device during adjustment of the light device, and wherein the horizontal adjustment arm and the vertical adjustment arm are configured to move the light device based upon signals transmitted by the remote control and received by the mounting base, wherein the horizontal adjustment arm and the vertical adjustment arm each comprise a linear actuator for movement of the light device, wherein an end of each linear actuator is connected to the mounting base, and wherein the mounting base comprises a power source for powering the linear actuators, the power source comprising one or more rechargeable batteries.

2. The portable remote controlled light adjustment device of claim 1, wherein the remote control comprises a transmitter and the mounting base comprises a receiver, the transmitter and receiver being configured to wirelessly transmit or receive signals.

3. The portable remote controlled light adjustment device of claim 2, wherein the transmitter and the receiver are configured to transmit and receive radio frequency signals.

4. The portable remote controlled light adjustment device of claim 1, wherein the horizontal adjustment arm comprises brackets for holding a section of the light device such that allows rotation of the light device by extending or retracting the actuator.

5. The portable remote controlled light adjustment device of claim 1, wherein the vertical adjustment arm comprises a clip for coupling to a bottom section of the light device such that the light device is moveable in a vertical direction as the actuator is extended or retracted.

6. The portable remote controlled light adjustment device of claim 2, wherein the receiver of the mounting base is configured to activate actuators of the horizontal and vertical adjustment arms.

7. The portable remote controlled light adjustment device of claim 6, wherein the power source in the mounting base is further for powering the receiver.

8. The portable remote controlled light adjustment device of claim 1, further comprising:

an anchor configured to clamp around a post or mast carrying the light device, and support bars connecting the mounting base to the anchor and to lock the mounting base in place and allow for adjustments.

9. A method for adjusting a light device, the method comprising:

installing a remote-controlled light adjustment device at a light device, adjusting or aligning the light device using a remote control in combination with the adjustment device, and removing the remote-controlled light adjustment device from the light device, wherein the remote-controlled light adjustment device comprises:
a horizontal adjustment arm,
a vertical adjustment arm,
a mounting base comprising anchor points, the horizontal adjustment arm and the vertical adjustment arm being coupled to the mounting base at the anchor points, wherein the mounting base comprises a receiver for receiving signals from a remote control, and
an anchor and support bars,
wherein the installing of the remote-controlled light adjustment device comprises:
placing the mounting base over an elbow of the light device,
attaching the anchor and support bars around a mast carrying the light device with light head,
aligning the horizontal adjustment arm such that brackets or fingers line up with a current position of the light head,
securing the anchor around the mast,
aligning the vertical adjustment arm such that a clip or fingers clip into a hinge at a bottom section of the light head, and
loosening or removing bolts of the elbow at the light device such that light head is movable in vertical and horizontal directions,
wherein the adjusting or aligning the light device using the remote control in combination with the adjustment device comprises:
proceeding to an aiming point of the light device according to railroad standard procedure,
adjusting, using the remote control, the light head to provide a brightest light beam at the aiming point, the remote control transmitting signals to the mounting base,
returning to the light device and tighten or applying the bolts at the elbow to lock an adjusted position of the light head.

10. The method of claim 9,
wherein the removing of the remote controlled light adjustment device from the light device comprises:
removing the vertical adjustment arm from the bottom section of the light head,
loosening the anchor and support bars from the mast,
lifting or removing the mounting base with horizontal and vertical adjustment arms from the elbow of the light device.

11. The method of claim 9, further comprising:
repeating the steps of
installing a remote-controlled light adjustment device at a light device,
adjusting or aligning the light device using a remote control in combination with the adjustment device, and
removing the remote-controlled light adjustment device from the light device.

* * * * *